US012567680B2

(12) United States Patent
Gonzalez et al.

(10) Patent No.: US 12,567,680 B2
(45) Date of Patent: Mar. 3, 2026

(54) ANTENNA DEVICE, ARRAY OF ANTENNA DEVICES

(71) Applicant: HUAWEI TECHNOLOGIES CO., LTD., Shenzhen (CN)

(72) Inventors: Ignacio Gonzalez, Munich (DE); Grzegorz Wolosinski, Munich (DE); Bruno Biscontini, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 271 days.

(21) Appl. No.: 18/190,266

(22) Filed: Mar. 27, 2023

(65) Prior Publication Data

US 2023/0231319 A1 Jul. 20, 2023

Related U.S. Application Data

(63) Continuation of application No. PCT/EP2020/077052, filed on Sep. 28, 2020.

(51) Int. Cl.
*H01Q 21/06* (2006.01)
*H01Q 5/10* (2015.01)

(52) U.S. Cl.
CPC ............. *H01Q 21/061* (2013.01); *H01Q 5/10* (2015.01)

(58) Field of Classification Search
CPC ............................... H01Q 21/061; H01Q 5/10
See application file for complete search history.

(56) References Cited

U.S. PATENT DOCUMENTS

| | | | |
|---|---|---|---|
| 6,005,519 A | 12/1999 | Burns | |
| 10,461,438 B2 | 10/2019 | Shen et al. | |
| 2019/0020114 A1* | 1/2019 | Paulotto | H01Q 9/40 |

FOREIGN PATENT DOCUMENTS

| | | | |
|---|---|---|---|
| CN | 107785665 A | 3/2018 |
| JP | 2003309429 A | 10/2003 |
| KR | 101290087 B1 | 8/2013 |
| WO | 2007011295 A1 | 1/2007 |
| WO | 2014045966 A1 | 3/2014 |
| WO | 2018072827 A1 | 4/2018 |
| WO | 2019116970 A1 | 6/2019 |

OTHER PUBLICATIONS

Mingde Du et al., A Low Profile Dual Polarized Slot Coupled Patch Antenna. World Academy of Science, Engineering and Technology International Journal of Electronics and Communication Engineering, vol. 12, No. 1, 2018, 5 pages.

(Continued)

*Primary Examiner* — Graham P Smith

(74) *Attorney, Agent, or Firm* — HAUPTMAN HAM, LLP

(57) ABSTRACT

An antenna device, an array of antenna devices, and a base station having an antenna device. A radiator is configured to radiate an electromagnetic signal in a direction parallel to a radiating axis of the antenna device. The radiator has a substantially planar shape perpendicular to the radiating axis and a resonant structure adjacent to the radiator. The resonant structure has a substantially planar shape parallel to the radiator, wherein the radiator is configured to radiate the electromagnetic signal in a first frequency band and the resonant structure is configured to have a resonant frequency within the first frequency band.

20 Claims, 8 Drawing Sheets

(56) References Cited

OTHER PUBLICATIONS

International Search Report issued in corresponding International Application No. PCT/EP2020/077052, mailed Jul. 14, 2021, pp. 1-24.
Office action dated May 14, 2024 from corresponding application No. JP 2023-519315.
Korean Office Action issued in corresponding Korean Application No. 9-5-2024-010596058, dated Feb. 1, 2024, pp. 1-7.

* cited by examiner

ANTENNA DEVICE, ARRAY OF ANTENNA DEVICES

CROSS-REFERENCE TO RELATED APPLICATIONS

This application is a continuation of International Application No. PCT/EP2020/077052, filed on Sep. 28, 2020, the disclosure of which is hereby incorporated by reference in its entirety.

TECHNICAL FIELD

The present disclosure relates generally to the field of telecommunication devices, and more specifically, to an antenna device and an array of antenna devices.

BACKGROUND

In recent times, the rapid development of various wireless communication systems is attributed to the contemplation of innovative antenna technologies including diversity antennas, reconfigurable antennas and so forth. Such systems operate within different frequency bands and consequently use separate radiating elements for each frequency band. Typically, to provide dedicated antennas for such systems, a plurality of antennas are used at each site. Thus, there exists a dire need for a compact antenna as a single structure capable of servicing all applicable frequency bands. Moreover, with the growing demand for a deeper integration of antennas with Radios, e.g. Active Antenna Systems (AAS), new ways of extending the bandwidth of low-profile antennas are being requested without compromising antenna Key Performance Indicators (KPIs).

Conventionally, an increasing number of antenna arrays are integrated in the same enclosure. However, said integration of antenna arrays results in highly complex antenna systems and strongly (or adversely) influence the antenna form factor, which is fundamental for the commercial field deployment of said antenna systems. However, said integration usually comes at a considerable cost. As a result, to cover the standard operating bands in antenna systems including, but not limited to, modern base station antenna systems that maintain the same radio frequency (RF) performance and to easily integrate an antenna element with other components, new concepts/architectures different from the legacy technology are to be developed.

Moreover, while considering the antenna (or radiating element) performance, integrating a greater number of antennas (consequently frequency bands) together in a small space implies a high level of coupling (unwanted energy transfer) between them, which degrades the signal quality. Coupling between systems (or antennas) is potentially a critical limiter on the performance and therefore on the capacity provided by the antenna. Thus, it is of utter importance to control or reduce the level of coupling to reduce its impact as much as possible. Consequently, a need for an antenna or a system having an improved isolation between the antenna arrays is developed. Alternatively stated, a need for a system or a method for detuning an antenna in desired frequency bands to reject the unwanted coupling with adjacent antennas, especially for antenna systems having alternating frequency bands is developed.

Further conventionally, a duplexer is coupled to the antenna systems to separate transmission (TX) and receiving (RX) signal paths. The duplexer allows both the TX and RX circuitry to share the same antenna to save space and cost, while isolating the TX and RX signals from each other. Typically, the TX and RX signals occupy different frequency bands, herein the duplexer incorporates the functions of band-pass filtering and frequency multiplexing to the antenna device. However, the duplexer itself, as an added device occupies extra space and additional costs, increasing the physical footprint of the antennas. Moreover, such conventional antenna devices are resource intensive, i.e., use greater manpower, skill or effort and time for installation thereof. Typically, increased number of parts results in more contact points and to further electrically couple such contact points a greater number of soldering joints are used. Additionally, for conventional antenna devices operating with more than one frequency band, a glitch-less and interference-free communication always remains a challenge.

Therefore, in light of the foregoing discussion, there exists a need to overcome the aforementioned drawbacks associated with conventional antenna devices.

SUMMARY

Embodiments described herein provide an antenna device and an array of antenna devices. Embodiments described herein provide a solution to the existing problem of structural and manufacturing complexities and installation efforts associated with conventional antenna devices. Embodiments described herein provide a solution that overcomes at least partially the problems encountered in prior art and provide an improved antenna device that is easily installable and having lower structural and manufacturing complexities. Further, the antenna device of at least one embodiment operates within multiple frequency bands having improved performance without the use of an additional device such as a duplexer. Moreover, embodiments described herein provide a solution to the existing problems of inherent coupling between adjacent antenna devices operating within multiple frequency bands and to minimize the impact of antenna deployment.

Embodiments described herein achieve the solutions provided in the enclosed independent claims. Advantageous implementations of embodiments described herein are further defined in the dependent claims.

In a first aspect, at least one embodiment provides an antenna device comprising a radiator configured to radiate an electromagnetic signal in a direction parallel to a radiating axis of the antenna device. The radiator having a substantially planar shape perpendicular to the radiating axis and a resonant structure adjacent to the radiator. The resonant structure having a substantially planar shape parallel to the radiator, wherein the radiator is configured to radiate the electromagnetic signal in a first frequency band and the resonant structure is configured to have a resonant frequency within the first frequency band.

The antenna device of at least one embodiment is a low profile, light weight, compact antenna device that integrates more frequency bands and maintains a small form factor. The antenna device is compact in size and has lower complexity (i.e. the structural and manufacturing complexities) as compared to a conventional antenna device. For example, the antenna device does not use parts, like probes or cables, to connect feeding lines and thereby reducing the overall complexity for the antenna device. Further, the antenna device filters one or more frequency bands (i.e. sub bands) based on resonant frequencies associated to the resonant structures without an implementation of an additional filter. Furthermore, the antenna device does not use any additional device (such as a duplexer) to operate within the multiple frequency bands and also eliminates or greatly minimizes the coupling between adjacent antenna devices. Consequently, the number of additional devices and parts are reduced, thereby reducing the number of soldering joints used for the installation of the antenna device. As a result, reducing the overall structural and manufacturing complexities associated with the antenna device, which in turn reduces the installation effort from a time, cost and labour perspective. Moreover, by virtue of a radiating direction of the radiator and the resonant structure parallel to the radiating axis, the directivity of the antenna device is improved.

In at least one embodiment, the resonant structure is arranged in the reactive near field of the radiator.

In at least one embodiment, wherein a distance between the radiator and the resonant structure is determined based on a central wavelength, $\lambda_{central}$, of the first frequency band, and is determined to be between 0.001 and $0.1\lambda_{central}$.

In at least one embodiment, the resonant structure is formed from one of a metal sheet, a printed circuit board or a board with metal foil deposit; and is mounted to the radiator by one or more supports or is mounted on a substrate laminated onto the radiator.

The implementation of the resonant structure in such a manner makes the antenna device compact and reduces the structural complexity and installation effort. Moreover, implementation as a metal sheet, printed circuit board or metallized plastic provides greater flexibility to design the filters.

In at least one embodiment, the radiator is a patch antenna and the antenna device further comprises a director having a planar structure arranged parallel to the radiator and spaced apart from the radiator.

In comparison to conventional antenna devices, the patch antennas are low profile, lighter in weight and consume a lower volume. Moreover, low cost, smaller in dimension and ease of fabrication and conformity.

In at least one embodiment, the antenna device further comprising at least one second resonant structure adjacent to the director, the resonant structure having a substantially planar shape parallel to the director, wherein the second resonant structure is configured to have a second resonant frequency within the first frequency band.

The director provides an increased impedance bandwidth and high directivity to the antenna device. Moreover, the increased impedance bandwidth is achieved directly or indirectly via the resonant structure acting as a parasitic element.

In at least one embodiment, the resonant structure is configured to act as a parasitic element of the antenna device.

The resonant structure acting as a parasitic element influences the input impedance of the antenna device significantly with respect to the size and position of the resonant structure. Moreover, a bandwidth enhancement and/or an enhanced radiation or is achieved directly or indirectly via the resonant structure (or parasitic element).

In at least one embodiment, a shape of the resonant structure is symmetric about a central point of the resonant structure.

In at least one embodiment, a length of the resonant structure is determined based on the resonant frequency.

The length of the resonant structure is varied to provide optimum frequency ranges for the antenna devices to operate. This variation in length allows the two or more multiple devices to operate without coupling and as a result, improving the overall performance.

In at least one embodiment, the resonant frequency is determined based on a second frequency band radiated by another antenna device arranged adjacent to the antenna device.

The determination of the resonant frequency based on the frequency band of the adjacent antenna device enables multiple antenna devices to co-exist and operate without coupling or interference during operation, enabling optimum operation for the antenna devices.

In a second aspect, at least one embodiment provides an array of two or more of the antenna devices, the array comprising two or more antenna devices of the first aspect.

The use of two or more additional devices in conjunction with the antenna device allows the antenna device to operate in multiple frequency bands (i.e. more than two frequency bands). This enables in improving an overall capability of the antenna device and allows the antenna device to accommodate one or more antenna devices around itself without degrading the performance thereof. Moreover, such a provision allows multiple antenna devices to coexist and operate without interference or coupling between the two or more antenna devices. Moreover, the integration of multiple antenna devices in a single array improves the overall performance, reduces the overall complexity and the associated costs of the antenna devices.

The array of antenna devices of the second aspect achieves all the advantages and effects of the antennae device of the first aspect.

In at least one embodiment, the array of antenna devices comprising a first antenna device operating in a first frequency band and having a first resonant structure tuned to a first resonant frequency. Further, the array comprising a second antenna device operating in a second frequency band and having a second resonant structure tuned to a second resonant frequency, wherein the first resonant frequency is determined based on the second frequency band and the second resonant frequency is based on the first frequency band.

The implementation of the array in such a manner and the determination of the resonant frequencies based on the frequency band of the adjacent antenna device enables antenna devices of the array to co-exist and operate without coupling or interference during operation by detuning frequency bands of high return losses, enabling optimum operation for the antenna devices. Moreover, such an implementation allows a duplexing behaviour for the array without the usage of an additional device such as a duplexer.

In at least one embodiment, the array of antenna devices comprising the first antenna device is configured for uplink and the second antenna device is configured for downlink.

The implementation of the array of antenna devices in such a manner enables bi-directional communication with the antenna devices without the implementation of duplexers, thereby reducing the physical footprint and associated manufacturing costs.

In at least one embodiment, the first frequency band overlaps with the second frequency band.

Even the overlapping nature of the frequency bands does not provide an interference or scattering impact of the signals during operation of the antenna device due to the detuned overlapping regions by the antenna devices.

In at least one embodiment, the first frequency band and the second frequency band each comprise a plurality of sub-bands and the sub-bands of the first frequency band are interleaved with the sub-bands of the second frequency band.

Embodiments described hereinabove are able to be combined. All devices, elements, circuitry, units and means described in embodiments herein are able to be implemented in the software or hardware elements or any kind of combination thereof. All steps which are performed by the various entities described in embodiments herein as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, a skilled person understands that these methods and functionalities are able to be implemented in respective software or hardware elements, or any kind of combination thereof. Features of embodiments described herein are susceptible to being combined in various combinations without departing from the scope as defined by the appended claims.

Additional aspects, advantages, features and objects of embodiments described herein are able to be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood in response to being read in conjunction with the appended drawings. For the purpose of illustrating embodiments described herein, exemplary constructions of the described embodiments are shown in the drawings. However, embodiments described herein are not limited to specific methods and instrumentalities disclosed herein. Moreover, those in the art understand that the drawings are not to scale. Wherever possible, like elements have been indicated by identical numbers.

Embodiments are described herein by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. In response to a number being non-underlined and accompanied by an associated arrow, the non-underlined number is used to identify a general item at which the arrow is pointing.

DETAILED DESCRIPTION OF EMBODIMENTS

The following detailed description illustrates embodiments and ways in which the embodiments are able to be implemented. Although some modes of carrying out the embodiments have been disclosed, those skilled in the art recognize that other embodiments for carrying out or practicing embodiments described herein are also possible.

Figure 1:
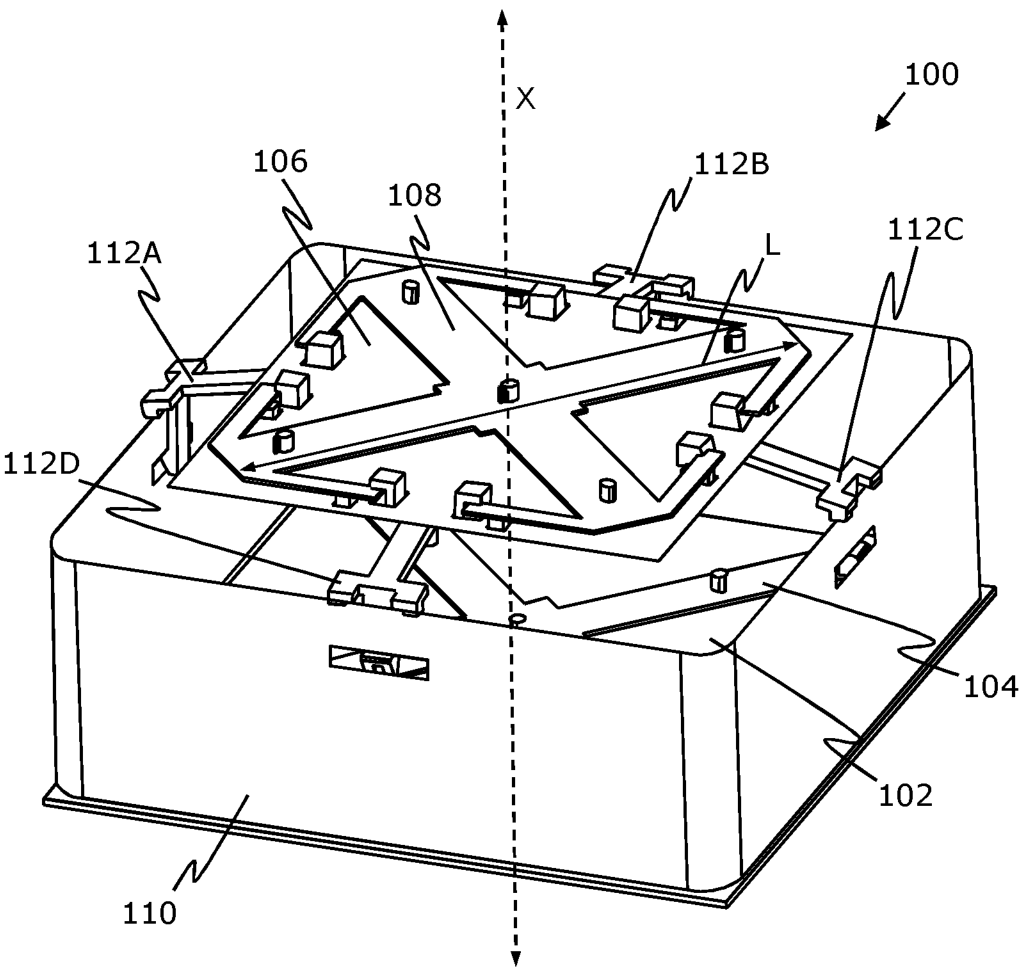
FIG. 1 is a perspective view of an antenna device, according to at least one embodiment.

FIG. 1 is a perspective view of an antenna device, according to at least one embodiment. With reference to FIG. 1, there is shown an antenna device 100. The antenna device 100 includes a radiator 102 and a resonant structure 104 (better shown in FIG. 2). The radiator 102 includes a substantially planar shape perpendicular to a radiating axis X. There is further shown a first set of supporting structures 112 comprising a first supporting structure 112A, a second supporting structure 112B, a third supporting structure 112C, and a fourth supporting structure 112D in the antenna device 100.

The antenna device 100 is also referred to as a radiating element, a radiating device, or an antenna element of an antenna. The antenna device 100 is used for telecommunication. For example, the antenna device 100 is used in a wireless communication system. In some embodiments, an array of such antenna devices or one or more antenna devices, is used in the communication system. Examples of such wireless communication system include, but is not limited to, a base station (such as an Evolved Node B (eNB), a gNB, and the like), a repeater device, a customer premise equipment, and other customized telecommunication hardware.

The radiator 102 is configured to radiate an electromagnetic signal along the X direction of the antenna device 100. The electromagnetic signal is radiated in response to the antenna device 100 being in operation. The term 'electromagnetic signal' includes signal propagation by simultaneous periodic variations of electric and magnetic field intensity, which includes radio waves, microwaves, infrared, light, ultraviolet, X-rays, and gamma rays. The term "radiating axis" refers to an axis having the same direction as that of the radiated electromagnetic signal from the radiator 102. The radiator 102 has a substantially planar shape perpendicular to the radiating axis X. The term "substantially planar" refers to the shape of the radiator 102 i.e. a flat and uninterrupted shape, that further includes perforations or openings, divots, or other interruptions therein. Moreover, the shape of the radiator 102 is curved or bent. As shown in FIG. 1, the radiator 102 has a substantially planar shape and is arranged in a direction perpendicular to the radiating axis X. The radiator 102 is configured to radiate the electromagnetic signal in a first frequency band. The electromagnetic signal occupies a range of frequencies carrying most of its energy, called its bandwidth. The term "frequency band" represents one communication channel or be subdivided into various frequency bands as per implementation, such as a first frequency band, a second frequency band and so forth. In an example, the first frequency band is defined by a frequency range, i.e. 1.7 GHz to 2.0 GHz. In another example, the second frequency band is defined by a frequency range, i.e. 1.8 GHz to 2.2 GHz.

In accordance with an embodiment, the radiator 102 is a patch antenna. The term "patch antenna" refers to a type of antenna having a low profile that is potentially mounted over a flat surface such as a flat radiating patch. Notably, the flat radiating patch forms the part of the radiator 102 that is configured to radiate the electromagnetic signal along the X direction. Generally, the radiator 102 comprises of a flat rectangular sheet or "patch" of metal, mounted over a larger sheet of metal called a ground plane. In at least one embodiment, the radiator 102 is a metallic patch radiator. Beneficially, patch antennas provide a low weight, low profile planar configuration. Moreover, the patch antennas provide an ease of fabrication, and integration with other devices (such as other antenna devices).

Figure 2:
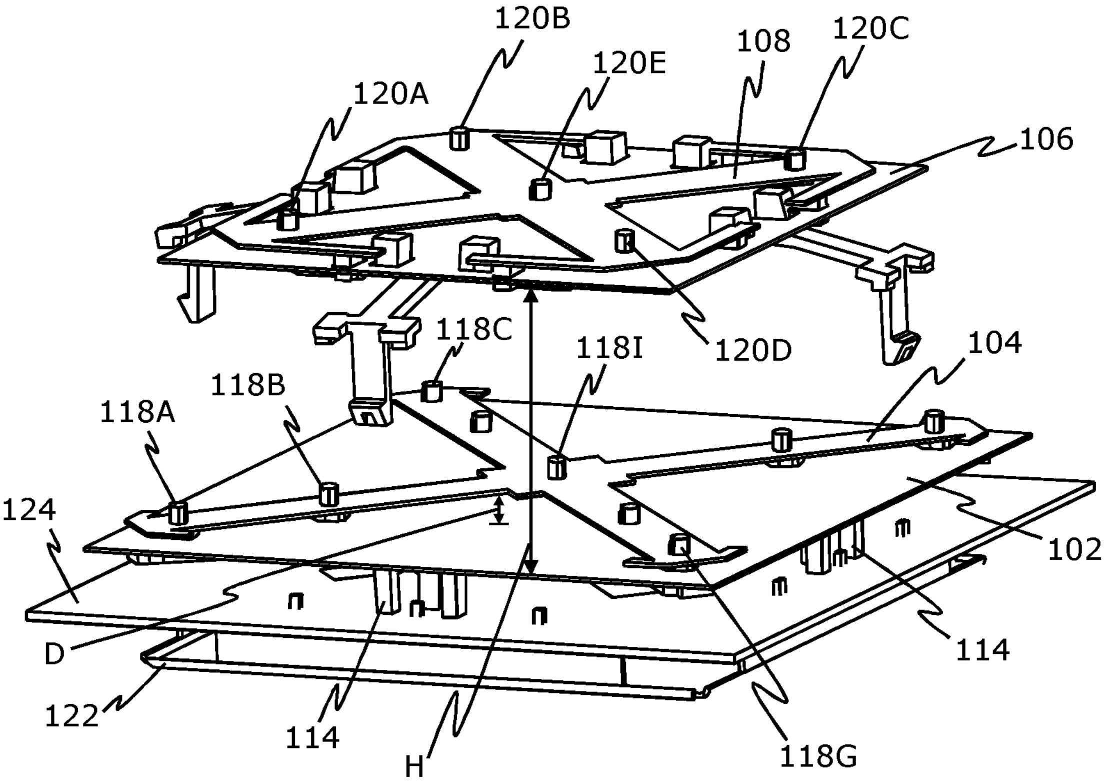
FIG. 2 is an exploded view of the antenna device of FIG. 1 with an enclosing wall removed thereof, according to at least one embodiment.

In an embodiment, the resonant structure 104 is arranged above the radiator 102 of the antenna device 100. The term "resonant structure" refers to an element of the antenna device 100 configured to resonate at a desired frequency during operation. The desired frequency is the preferred frequency at which the resonant structure 104 filters the electromagnetic signal radiated by the antenna device 100. In this sense, the resonant structure 104 detunes the radiator 102 at the resonant frequency of the resonant structure 104. The resonant structure 104 is placed adjacent to the radiator 102 at a pre-determined distance from the radiator 102. The resonant structure 104 has a substantially planar shape parallel to the radiator 102. The resonant structure 104 has a cross-shaped structure (as shown in FIG. 2) having two elongated arms (also referred to as stubs). Moreover, the resonance structure 104 has a uniform shape, i.e. the physical dimensions of the resonant structure 104, such as the width and length of the cross-shaped structure of the resonant structure 104 are uniform. It will be apparent that primarily a suitable length allows the resonant structure 104 to resonate at a desired frequency during operation. Typically, a length L of stubs is made uniform and hence the size of the resonance structure 104 to implement the desired frequency for operation. However, a person skilled in the art understands that the shape and size of the resonant structure 104 are able to be changed without limiting the scope embodiments described herein. Moreover, the size and the shape of the resonant structure 104 is potentially varied to adapt to the desired resonant frequency. Alternatively stated, the resonant frequency is potentially varied by changing the size and shape of the resonant structure 104. For example, length of the stubs is varied to provide dual resonances to the antenna device 100.

In accordance with an embodiment, a shape of the resonant structure 104 is symmetric about a central point of the resonant structure 104. Notably, the symmetrical cross-shaped structure of the resonant structure 104 allows the antenna device 100 to exhibit a dual polarised characteristic, i.e. respond to both horizontally and vertically polarized radio waves simultaneously. Further, the resonant structure 104 is not configured to have a non-symmetrical structure in response to the antenna device 100 being configured to exhibit single polarised characteristic, i.e. operable to respond only to one orientation of polarization either horizontal or vertical.

As shown in FIG. 1, the resonant structure 104 has the cross-shaped structure. Further, the cross shaped structure is symmetric about a central point of the resonant structure 104. In other words, the central point of the resonant structure 104 divides the resonant structure 104 into two equal halves or equal mirror images of each half of the resonant structure 104 about the central point. In other words, the length L of each elongated arm or stub is the same. Optionally, the length L of the stub is varied as per the implementation without limiting the scope of least one embodiment.

The resonant structure 104 is configured to have a resonant frequency within the first frequency band. The resonant structure 104 is configured to operate at a resonant frequency within the first frequency band of the radiator 102. The term "resonant frequency" refers to the frequency at which the resonant structure 104 filters a sub-band in the first frequency band associated to the antenna device 100.

In at least one embodiment, the resonant structure 104 is arranged in the reactive near field of the radiator 102. The term "reactive near field" refers to the region adjacent to an antenna (such as the antenna device 100). In said region, the Electric field (or E-Field) and the Magnetic field (or H-Field) of the electromagnetic signal are 90 degrees out of phase with respect to each other and are therefore reactive. Generally, the reactive near field is the region in which strong inductive and capacitive effects from the currents and charges present in an antenna device (such as the antenna device 100) operable to cause electromagnetic components (such as the electromagnetic signal) do not behave like far-field radiation, i.e. said inductive and capacitive effects decrease in power more quickly with respect to distance from radiator (such as the radiator 102) than the far-field radiation effects. As shown in FIG. 1, the resonant structure 104 is placed apart from the radiator 102 and within the reactive near field of the radiator 102.

In accordance with at least one embodiment, the resonant structure 104 is placed apart from the radiator 102, wherein a distance D between the radiator 102 and the resonant structure 104 is determined based on a central wavelength, $\lambda_{central}$, of the first frequency band. The term "central wavelength" refers to the midpoint of spectral bandwidth (such as of the first frequency band) over which the filter (or the resonant structure 104) operates. Typically, the distance D between the radiator 102 and the resonant structure 104 is maintained by the usage of support tabs (as shown in FIG. 2). In operation, the distance D, of the first frequency band is determined to be between 0.001 and $0.1\lambda_{central}$. For example, considering speed of light (c) as $3\times10^8$ m/s and the corresponding central frequency to be equal to 1.85 GHz for the first frequency band, then the distance D between the radiator 102 and resonant structure 104 will be in the range of 0.0162 cm to 1.62 cm.

In accordance with at least one embodiment, the resonant structure 104 is formed from one of a metal sheet, a printed circuit board or a foil of dielectric material with a metallized deposit. In an example, the resonant structure 104 is implemented as a single layer printed circuit board, a multi-layer printed circuit board, a flexible PCB or a flexi-rigid PCB. Further, the resonant structure 104 is a formed using a folded metal sheet such as a metallic sheet of copper, aluminium, iron and the like. Furthermore, the resonant structure 104 is a foil of dielectric material with a metallized deposit. In an implementation, a foil of dielectric (or a very thin plastic) with a metallized deposit is used. In another implementation, the resonant structure 104 is a laser cut metal sheet. The board using the foil of dielectric material is formed using metallization achieved by printing of conductive traces or pathways onto one or both sides of the board. The board is a thermoplastic part, metallic board, semiconductor sheet and the like. The materials for the foil of dielectric includes, but is not limited to, Bakelite or FR4 Glass Epoxy. Moreover, the printing of the conductive traces is performed using at least one of aerosol jet, inkjet, or screen printing. Further, the resonant structure 104 is mounted to the radiator 102 by one or more supports 118 (also referred to as support tabs) or is mounted on a substrate (not shown) laminated onto the radiator 102. The one or more supports (also referred to as support tabs) are provided at specific locations throughout the radiator 102 to hold the resonant structure 104 at the distance D from the radiator 102. The "substrate" refers to the mechanical support of the radiator 102. To provide said support, the substrate primarily consists of a dielectric material (such as the dielectric material of the foil of dielectric) and affects the electrical performance of the antenna device 100.

In accordance with at least one embodiment, the antenna device 100 further comprises a director 106 having a planar structure arranged parallel to the radiator 102 and spaced apart from the radiator 102. The "director" 106 refers to an element of the antenna device 100 configured to increase the energy gain and directionality of the radiation i.e. the electromagnetic signal of the radiator 102. The term "director" refers to an element configured to increase radiation of a driven element (such as the radiator 102) in its own direction. Beneficially, the director 106 is arranged parallel to the radiator 102 to enhance the radiation of the radiator 102. Generally, the director 106 is a parasitic element. Alternatively stated, the director 106 receives its energy from the radiator 102. The director 106 is configured to enhance the radiation i.e. of the radiated electromagnetic signal in terms of energy. Alternatively stated, the director 106 increases the directivity of the radiator 102. Generally, the size of the director (such as the director 106) is smaller than the size of the driven element (such as the radiator 102). As shown in FIG. 1, the size of the director 106 is smaller than the size of the radiator 102. In an example, the size of the director 106 is 5% smaller or shorter than the driven element i.e. the radiator 102.

In accordance with at least one embodiment, the antenna device 100 further comprises at least one second resonant structure (such as the resonant structure 108) adjacent to the director 106. The second resonant structure 108 is arranged adjacent to the director 106 and has a shape similar to the resonant structure 104 arranged adjacent to the radiator 102, and wherein the second resonant structure 108 is smaller than the first resonant structure 104. The second resonant structure 108 has a substantially planar shape parallel to the director 106. Typically, the second resonant structure 108 is arranged adjacent and parallel to the director 106. Collectively, the radiator 102, the director 106 and each of the resonant structures i.e. the first resonant structure 104, the second resonant structure 108 are arranged parallel with respect to each other and arranged perpendicular to the radiating axis X of the radiator 102. Further, the second resonant structure 108 is configured to have a second resonant frequency within the first frequency band. The second resonant frequency is different from the first resonant frequency within the first frequency band. However, the second resonant frequency is the same as the first resonant frequency to achieve an increased rejection level of the frequency band (such as the first frequency band). Collectively, the first resonant frequency and the second resonant frequency enable the regions in the first frequency band, wherein the radiator 102 is detuned i.e. at the resonant frequency.

In accordance with at least one embodiment, the resonant structure (such as the resonant structure 104, the second resonant structure 108) is configured to act as a filter operating at the resonant frequency (such as the first resonant frequency, the second resonant frequency respectively). Specifically, the first resonant structure 104 and the second resonant structure 108 are arranged in a manner so as to act as a filter operating at the resonant frequency (such as the first resonant frequency for the resonant structure 104, the second resonant frequency for the second resonant structure 108). Herein, the resonant structure 104, 108 is configured to reject or filter a sub band of the first frequency band, for example from 1.8 GHz-1.9 GHz. Alternatively stated, the antenna device 100 is detuned in the first frequency band.

In accordance with at least one embodiment, the resonant structure 104, 108 is configured to act as a parasitic element of the antenna device 100. The term "parasitic element" refers to an element that depends on the feed of another element (such as the radiator 102). In other words, the parasitic element does not have their own feed and helps in enhancing the radiation (or the electromagnetic signal) indirectly. Notably, the resonant structure 104, 108 (i.e. the parasitic elements) is not directly connected to the feed. Alternatively stated, the resonant structure 104, 108 act as parasitic elements and derive power from the adjacent elements (such as the radiator 102). As shown in FIG. 1, the resonant structure 104 is electrically coupled to the radiator 102 to derive energy therefrom and does not have a direct connection to the feed or feeding arrangement of the antenna device 100.

In accordance with at least one embodiment, the antenna device 100 comprises two sets of supporting structures 112, 114, wherein the first set of supporting structures 112 are arranged between the director 106 and the second resonant structure 108, whereas a second set of supporting structures 114 (as shown in FIG. 2) are arranged between the radiator 102 and a base 124. The base 124 is implemented as a PCB and includes a reflector e.g. implemented as a metal layer on the PCB.

Each set of supporting structures i.e. the first set of supporting structures 112 and the second set of supporting structures 114 are electrically non-conductive. Moreover the first set of supporting structures 112 is configured to hold the director 106 at a height H from the radiator 102. As shown in FIG. 1, each supporting structure of the first set of supporting structures 112 comprises of two ends, namely a first end and a second end, wherein the first end of each of the supporting structure of the first set of supporting structures 112 is attached to the director 106 and the second end of each of the supporting structures of the first set of supporting structures 112 is attached to an enclosing wall 110 (configuring an antenna cavity) of the antenna device 100. Generally, each of the two sets of supporting structures 112, 114 are made of plastic, and are electrically non-conductive. Each of the two sets of supporting structures 112, 114 is formed from a single piece. The antenna device 100 is covered using the enclosing wall 110 whose distance from the antenna device 100 is adapted based on the implementation. The term "enclosing wall" refers to the wall surrounding the antenna devices made up of preferably a conductive material such as a metal.

In accordance with at least one embodiment, the second resonant structure 108 comprises extensions at each end of the cross shaped structure of the second resonant structure 108 and is mechanically coupled to the first set of supporting structures 112. At each end of the resonant structure 108, two extensions (forming a V-type structure) is arranged to be mechanically coupled to two of the four supporting structures of the first set of supporting structures 112. In an example, at a first end of the resonant structure 108, the two extensions at the first end of the resonant structure is coupled to the first supporting structure 112A and the second supporting structure 112B. Similarly, at a second end of the resonant structure 108, the two extensions at the second end of the second resonant structure 108 is coupled to the second supporting structure 112B and the third supporting structure 112C and so forth.

In accordance with at least one embodiment, wherein a length L of the resonant structure 104, 108 is determined based on the resonant frequency. Generally, the length L of the resonant structure 104, 108 follows an inverse relation with respect to the resonant frequency. For example, the higher the frequency of the resonant frequency, the shorter will be the length L of the resonant structure 104, 108 and vice versa. Alternatively stated, resonant structures 104, 108 for the higher resonant frequencies are shorter, to match length of the electromagnetic signals, whereas resonant structures 104, 108 for lower-frequency radio signals are longer. As shown in FIG. 1, the length L of the first resonant structure 104 is greater than the length (not shown) of the resonant structure 108, consequently the first resonant frequency of the first resonant structure 104 is lower as compared to the second resonant frequency of the second resonance structure 108. Specifically, the length L of the first resonant structure 104 is determined based on the first resonant frequency within the first frequency band, whereas the length (such as the length L) of the second resonant structure 108 is determined based on the second resonant frequency within the first frequency band.

FIG. 2 is an exploded view of an antenna device 100, according to at least one embodiment. With reference to FIG. 2, there is shown an exploded view of the antenna device 100. As shown, the antenna device 100 includes the radiator 102, the director 106, the first resonant structure 104 and the second resonant structure 108. The antenna device further comprises a feeding arrangement (not shown) arranged below the radiator 102 and above a ground layer (not shown), and a feeding cavity 122 wherein the feeding arrangement resides. Further, the ground layer and the feeding arrangement is formed using printed circuit boards, and further comprise electrical connections and wirings to enable the feed from the feeding arrangement to the antenna device 100.

Further shown, each of the first resonant structure 104 and the second resonant structure 108 comprises a plurality of perforations provided at different positions in each of the radiating structures 104, 108. As shown, the first resonant structure 104 comprises of nine perforations arranged throughout the first resonant structure 104. Specifically, each end of the first resonant structure 104 comprises of two perforations that may or may not be equally spaced with respect to another. Apart from the perforations at each end of the resonant structure 104, a perforation at a substantially central location is present. Notably, the perforations are provided at specific locations throughout the resonant structure 104 for accommodating a first set of support tabs 118. The term "support tab" refers to a projection of material attached to or projecting from any structure such as the radiator 102 or the resonant structure 104, used to hold or fasten the structures at a desired location.

Typically, the plurality of perforations (or nine perforations) on the first resonant structure 104 are provided to receive the first set of support tabs 118 comprising nine support tabs 118A-1, such as the first support tab 118A, the second support tab 118B, and so forth to the ninth support tab 1181 (central support tab). Each of the plurality of perforations (e.g. the nine perforations) of the first resonant structure 104 are configured to receive the second end of each of the nine support tabs 118A-I. Typically, the support tabs 118A-I are employed to hold the first resonant structure 104 at the distance D from the radiator 102.

Similarly, the second resonant structure 108 comprises of five perforations arranged throughout the second resonant structure 108 (similar to the first resonant structure 104). Specifically, each end of the second resonant structure 108 comprises of a single perforation. Apart from the single perforation at each end of the resonant structure 108, a perforation at a substantially central location of the second resonant structure 108 is present. Typically, the plurality of perforations (or five perforations) are provided to receive a second set of support tabs 120 comprising five support tabs 120A-E, i.e. the first support tab 120A, the second support tab 120B, and so forth to the fifth support tab 120E (central support tab). Each of the plurality of perforations (e.g. the five perforations) of the second resonant structure 108 is configured to receive the second end of each of the five support tabs 120A-E.

Notably, the support tabs 118, 120 are formed as an integral part of the supporting structures 112, 114. In other words, the support tabs 118A-I are a part of the first set of supporting structures 118 and the second set of support tabs 120A-E are a part of the second set of supporting structures 114.

Figure 3:
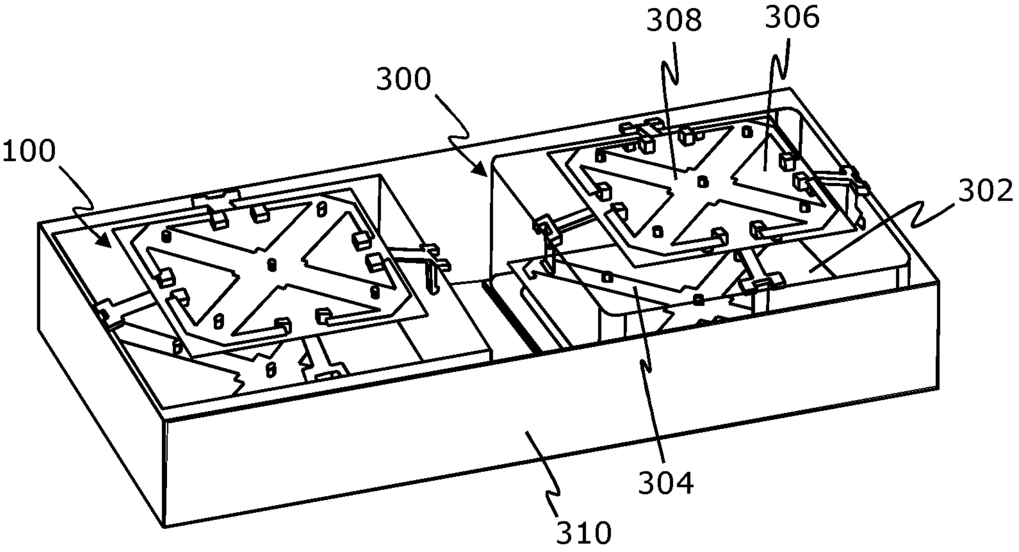
FIG. 3 is a perspective view of the antenna device of FIG. 1 and another antenna device, according to at least one embodiment.

FIG. 3 illustrates a perspective view of the antenna device 100 and another antenna device 300 (similar to the antenna device 100), according to at least one embodiment. With reference to FIG. 3, there is shown two antenna devices i.e. the antenna device 100 and another antenna device 300 spaced apart or isolated by a pre-determined distance. The antenna device 300 (or the second antenna device) is similar to the antenna device 100 in terms of shape and structure. Typically, the antenna device 300 comprises a second radiator 302, a first resonant structure 304 placed adjacent to the second radiator 302 and a director 306 (such as the director 106 of antenna device 100) placed at a distance from the second radiator 302. Moreover, the another antenna device 300 comprises a second resonant structure 308 adjacent to the director 306. Notably, the two antenna devices 100, 300 are spaced apart from an enclosing wall 310 (such as the enclosing wall 110) whose distance from the antenna devices 100, 300 is adapted based on the implementation. The term "enclosing wall" refers to the wall surrounding one or more antenna devices made up of preferably a conductive material such as a metal. A person known in the art appreciates that the distance between the two antenna devices and the distance between the antenna device and the enclosing wall is varied without limiting the scope of embodiments described herein. In an implementation, the isolation between the two antenna devices i.e. the antenna device 100 and the another antenna device 300 is approximately 0.6 $\lambda_i$, wherein $\lambda_i$ is equal to the central wavelength of the antenna devices $\lambda_{central}$. The first antenna device 100 and the another antenna device 300 are configured to operate in the first frequency band and a second frequency band respectively. Typically, the antenna device 100 comprises the resonant structure 104 and the resonant structure 108 configured to filter one or more sub bands of the first frequency band, wherein the another antenna device 300 operates. Similarly, the second antenna device 300 comprises a first resonant structure 304 and a second resonant structure 308 configured to filter one or more sub bands of the second frequency band, wherein the antenna device 100 operates.

In accordance with at least one embodiment, the first frequency band and the second frequency band each comprise a plurality of sub-bands, wherein the sub-bands of the first frequency band are interleaved with the sub-bands of the second frequency band. Typically, the sub bands of each of the frequency bands such as the first frequency band and the second frequency band overlap at least partially with one another. Moreover, operating sub-bands of each of the frequency bands is alternating with respect to the other. The term "operating sub-band" refers to the sub-band being operated in by any antenna device. In an example, a first sub band of the first frequency band is accompanied by a first sub band or a second sub band of the second frequency band. In an exemplary scenario, the first frequency band ranging from 1.4 GHz to 2 GHz includes a plurality of sub bands such as a first sub band between 1.71 GHz to 1.785 GHz and a second sub band between 1.805 GHz-1.88 GHz and the second frequency band ranging from 1.6 GHz to 2.4 GHz, includes a third sub band ranging from 1.92 GHz-1.98 GHz and a fourth sub band ranging from 2.11 GHz-2.17 Ghz. Herein, the interleaved sub-bands are present in an overlapping region of the two frequency bands, and the operating sub-bands within the two frequency bands are defined by the resonant frequencies associated to the resonant structures 104, 108. The resonant frequencies associated to the resonant structures 104, 108 is chosen based on the desired operating bands. Each of the plurality of sub bands such as the first, second, third and fourth sub band is present in an alternating manner based on different implementation purposes. In an example, the first sub band is used for uplink communication, whereas the fourth sub band is used for downlink communication.

In accordance with at least one embodiment, the resonant frequency (such as the first resonant frequency) is determined based on a second frequency band associated with another antenna device 300 (also referred to as the second antenna device) arranged adjacent to the antenna device 100. The first resonant frequency is determined based on the second frequency band of the another antenna device 300. Typically, the resonant frequency such as the first resonant frequency associated to the first resonant structure 104 is based on the sub bands within the second frequency band of the another antenna device 300. Similarly, the resonant frequency such as the second resonant frequency associated to the second resonant structure 304 is based on the sub bands within the first frequency band. The selective implementation of the two antenna devices enables each of the antenna devices i.e. the antenna device 100 and the another antenna device 300 to operate together without a degradation in performance by rejecting the sub bands within the first frequency band or the second frequency band, wherein the coupling between the two antenna devices 100, 300 is high.

In accordance with at least one embodiment, the first antenna device 100 and the another antenna device 300 is configured to act in combination as a system with duplexer. The first resonant structure 104 and the second resonant structure 304 is configured to act in combination as a duplexer during operation of the two antenna devices. The term "duplexer" refers to an electronic device that allows bi-directional (duplex) communication over a single path. Herein, the resonant structures 104, 304 allow the antenna devices 100, 300 to operate together and allows the antenna devices 100, 300 to perform bi-directional communication (for example, uplink and downlink) at the same time in a singular frequency band. In an implementation, the antenna device 100 performs downlink in the first frequency band and the another antenna device 300 performs uplink in the second frequency band. Alternatively, the uplink and downlink operations is reversed. Beneficially, the antenna device 100 does not use any additional part (such as the duplexer) for operation, consequently reducing the overall size and complexity.

Figure 4:
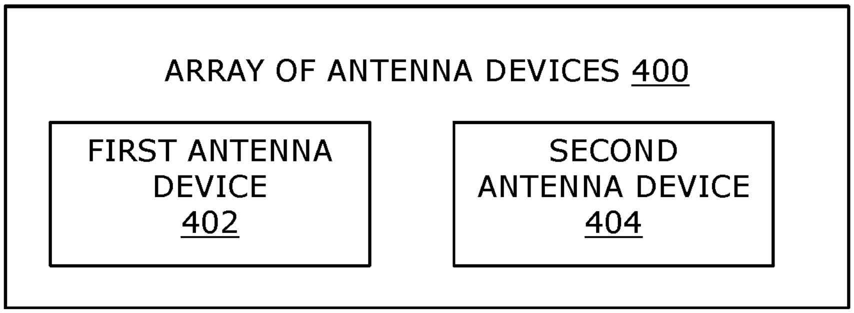
FIG. 4 is a block diagram of an array of antenna devices, according to at least one embodiment.

FIG. 4 is a block diagram of an array 400 of antenna devices, according to at least one embodiment. The array 400 of antenna devices should be read in conjunction with the antenna device 100 or the antenna device 300 (shown and explained in conjunction with FIGS. 1-3). The array 400 includes two or more antenna devices (such as the antenna device 100, the another antenna device 300). The array 400 of antenna devices include a plurality of antenna devices arranged in an array or a grid form. For example, the array 400 of antenna devices includes an antenna device 402 (similar to the antenna device 100), an antenna device 404 (similar to the another antenna device 300). The antenna devices 402, 404 is connected to a single receiver or transmitter by feedlines that feed the power to such antenna devices 402, 404 in a specific phase relationship to work together as a single antenna. As mentioned herein, the antenna device 100 operates at dual frequencies in the first frequency band, similarly the another antenna device 300 operates at dual frequencies in the second frequency band. Therefore, the array 400 of antenna devices is operable at one of the dual frequencies or both simultaneously. Moreover, each of the antenna devices 402, 404 in the array 400 is configured to either transmit or receive electromagnetic signals (such as the electromagnetic signal radiated by the radiator 102).

The array 400 of antenna devices includes two or more antenna devices, such as the antenna device 100. In such an instance, the array 400 of antenna devices is operable at one or multiple frequencies bands (for example, the first frequency band, second frequency band), i.e. within one, two or more than two frequency bands. Further, the two or more antenna devices 402, 404 of the array 400 of antenna devices is connected to multiple receivers or transmitters via feedlines in the feeding arrangement that is configured to feed the power to such two or more antenna devices 402, 404 in a specific phase relationship to work together as a single antenna or multiple antennas to communicate with the plurality of wireless communication devices. Further, examples of the plurality of wireless communication devices include, but is not limited to, a user equipment (e.g. a smartphone), a customer premise equipment, a repeater device, a fixed wireless access node, or other communication devices or telecommunications hardware.

In accordance with at least one embodiment, the array 400 of antenna devices comprises a first antenna device 402 operating in a first frequency band and having a first resonant structure (such as the resonant structure 104) tuned to a first resonant frequency and a second antenna device 404 operating in a second frequency band and having a second resonant structure (such as the resonant structure 304) tuned to a second resonant frequency. In an implementation, the first antenna device 402 operating in the first frequency band and the second antenna device 404 operating in the second frequency band form a dual-band array 400. Herein, the first resonant frequency of the first antenna device 402 defines a rejected sub-band in the first frequency band of the first antenna device 402 and the second resonant frequency of the second antenna device 404 defines a rejected sub band in the second frequency band of the second antenna device 404. Notably, the two antenna devices 402, 404 have interleaved frequency bands and are closely spaced, consequently the coupling between the two antenna devices 402, 404 tends to be high. As a result, the antenna elements that compose the array 400 are tuned in a broadband fashion.

In an implementation, the first antenna device 402 operating in the first frequency band is detuned at a first resonant frequency based on an operating sub band within the second frequency band of the second antenna device 404. For example, a first sub band ranging from 1.8 GHz-1.9 GHZ is rejected by the first antenna device 402. In other words, the first antenna device 402 is detuned at the first resonant frequency associated with the first resonant structure in a first operating sub band of the second antenna device 404.

Conversely, the second antenna device 404 operating in the second frequency band is detuned at a second resonant frequency associated with the second resonant structure based on the operating sub bands within the first frequency band of the first antenna device 402. For example, in the second frequency band ranging from 1.8 GHz to 2.2 GHz, a first sub band ranging from 1.7 GHz-1.8 GHz and a second sub band ranging from 1.9 GHZ to 2.0 GHZ are rejected by the second resonant structure of the second antenna device 404. In other words, the second antenna device 404 is detuned in the first operating sub band and the second operating sub band of the first antenna device 402.

Figure 5:
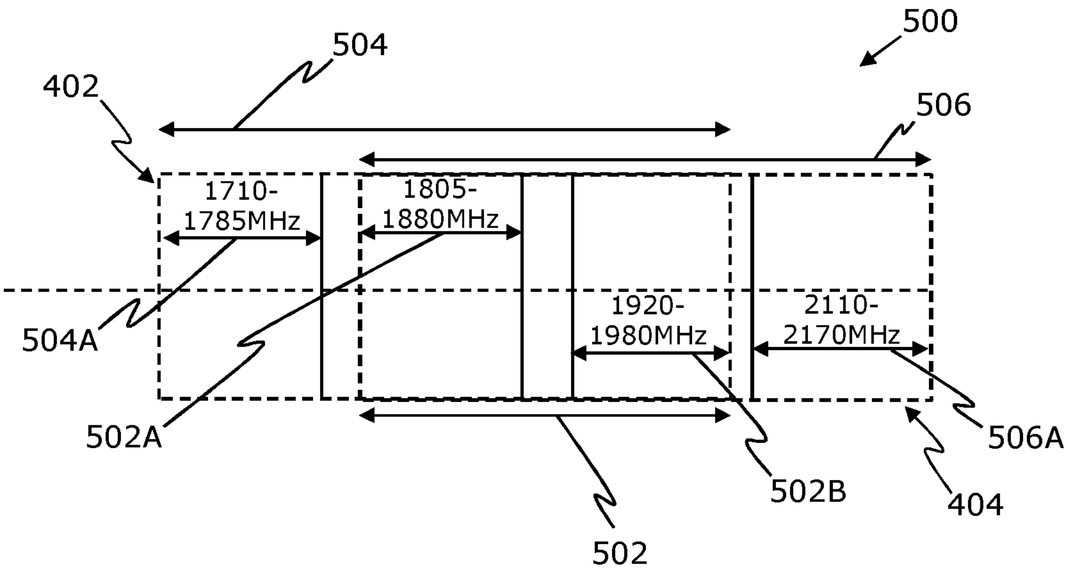
FIG. 5 is an exemplary frequency band of the array of antenna devices of FIG. 4 according to at least one embodiment.

FIG. 5 is an exemplary frequency band 500 of the array 400 of antenna devices 402, 404 according to at least one embodiment. FIG. 5 is described in conjunction with elements from FIGS. 1, 2, 3, and 4. With reference to FIG. 5, there is shown a graphical representation 500 of the exemplary first frequency band 504 and the exemplary second frequency band 506, of the array 400 of antenna devices 402, 404. Further shown, the operational characteristic of the first antenna device and the second antenna device, i.e. the type of operation being performed by each of the two antenna devices. In an implementation, the first frequency band 504 includes a first sub band 504A, wherein the first antenna device performs an uplink operation, whereas the second frequency band 506 includes a second sub band 506A, wherein the second antenna device performs a downlink operation. The "overlapping region" 502 represents the area wherein the first frequency band 504 and the second frequency band 506 are coinciding with one another. Alternatively stated, the overlapping region 502 is formed by a partial overlap of the first frequency band 504 and the second frequency band 506, wherein the overlapping region 502 includes a first overlapping region 502A and a second overlapping region 502B, further wherein the first antenna device performs an uplink operation in the second overlapping region 502B and the second antenna device performs a downlink operation in the first overlapping region 502A. Notably, the overlapping region 502 and the included sub overlapping regions 502A, 502B are also the sub bands of the first frequency band 504 and the second frequency band 506. In an example, the first frequency band 504 includes a Digital cellular system (DCS) 1800 MHz band and the second frequency band 506 includes an International Mobile Telecommunications (IMT) 2100 MHz band. Further, the two antenna devices during operation experience coupling within or near the overlapping region 502.

Consequently, to eliminate the coupling between the two antenna devices during operation, one or more sub bands from each of the first frequency band 504 and the second frequency band 506 are rejected by the resonant structures of the first antenna device and the second antenna device respectively. Specifically, in the first frequency band 504, a sub band (such as the first overlapping region 502A) ranging from 1.8 GHz-1.9 GHZ is rejected by the first antenna device in order for the second antenna device to operate without coupling in the rejected sub-band. Similarly, in the second frequency band 506, a sub band (such as the first sub band 504A) ranging from 1.7 GHz-1.8 GHz and a sub band (such as the second overlapping region 502B) ranging from 1.9 GHZ to 2.0 GHZ are rejected by the second antenna device in order for the first antenna device to operate in the rejected sub-bands.

In accordance with at least one embodiment, the first frequency band 504 and the second frequency band 506 together comprise a plurality of sub-bands including, but not limited to, the first sub band 504A, the second sub band 506A and the overlapping region 502. Furthermore, the overlapping region 502 comprises two sub bands, namely the first overlapping region 502A, the second overlapping region 502B. Furthermore, the sub-bands of the first frequency band 504 are interleaved with the sub-bands of the second frequency band 506 forming the overlapping region 502. Alternatively stated, the sub bands of the overlapping region 502 i.e. the first overlapping region 502A, the second overlapping region 502B are included within both the first frequency band 504 and the second frequency band 506. Typically, the sub bands of each of the frequency bands such as the first frequency band 504 and the second frequency band 506 overlap at least partially with one another. Moreover, the operating sub-bands of each of the frequency bands 502, 504 are alternating with respect to the other.

In accordance with at least one embodiment, the first antenna device 402 is configured for uplink and the second antenna device 404 is configured for downlink. Herein, the array 400 of antenna devices 402, 404 is configured for uplink and downlink operation. Specifically, the uplink operation is being performed by the first antenna device 402, whereas the downlink operation is being performed by the second antenna device 404. Typically, the uplink and downlink operation performed by the first antenna device 402 and the second antenna device 404 respectively is performed in different sub bands of the first frequency band and the second frequency band. In an example, the first frequency band 504 ranging from 1.4 GHz to 2 GHz includes a plurality of sub bands such as the first sub band 504A ranging between 1.71 GHz to 1.785 GHz and a third sub band such as the second overlapping region 502B ranging from 1.92 GHz-1.98 GHz. The second frequency band 506 ranging from 1.6 GHz to 2.4 GHz, includes a second sub band such as first overlapping region 502A between 1.805 GHz-1.88 GHz and a fourth sub band such as the second sub band 506A ranging from 2.11 GHz-2.17 Ghz. Each of the plurality of sub bands such as the first, second, third and fourth sub band is used for different implementation purposes. In an example, the first sub band 504A and the third sub band 502B is used for uplink communication, whereas the second sub band 502A and the fourth sub band 506A is used for downlink communication by the two antenna devices 402, 404.

In accordance with at least one embodiment, the first frequency band 504 overlaps with the second frequency band 506. The first frequency band 504 is different from the second frequency band 506, and such difference therebetween is substantial or non-substantial. Moreover, the first frequency band 504 potentially overlaps, at least partially with the second frequency band 506. Thus, the array 400 of antenna devices forms a dual band antenna device, i.e. configured to radiate electromagnetic signals (such as the first electromagnetic signal) in two frequency bands 504, 506 concurrently. In an example, array 400 comprising at least a first antenna device (such as the antenna device 402) operating at a first frequency band such as 1710-1980 MHz and at least a second antenna device (such as the second antenna device 404) operating at 1805 MHz-2170 MHz overlaps in the region (such as the overlapping region 502) between 1805 MHz and 1980 MHz.

Figure 6A:
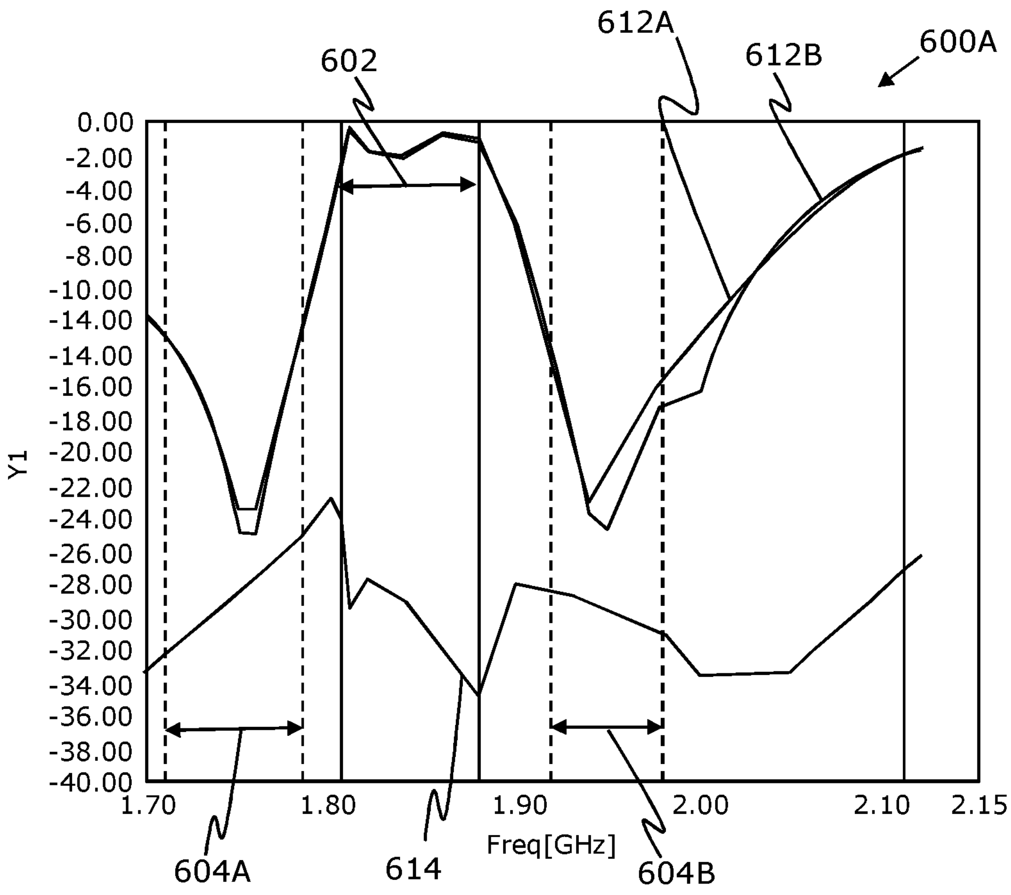
FIG. 6A is a graphical representation that depicts coupling between two antenna devices in two different frequency bands, according to at least one embodiment.

FIG. 6A is a graphical representation 600A that depicts the return losses and coupling levels c associated with the first antenna device 402 in the first frequency band 504, according to at least one embodiment. FIG. 6A is described in conjunction with elements from FIGS. 1, 2, 3, 4, and 5. With reference to FIG. 6A, there is shown the graphical representation 600A depicting the return losses and coupling levels in the first frequency band 504 associated with the first antenna device (similar to the antenna device 100). Herein, the first antenna device comprising two resonance structures (such as the first resonance structure 104 and the second resonance structure 108 of FIG. 1) are configured to reject a sub-band 602 (enclosed by the solid lines) ranging from 1.8 to 1.9 GHz. Notably, the two resonant structures are used together to provide a wider (or broader) sub-band for the second antenna device (such as the second antenna device 404) to operate, as each resonance structure (such as the first resonance structure 104 or the second resonance structure 108) individually would be too narrowband (or narrow). As a result, the antenna device is detuned for return loss (RL) worse than −2 dB in the frequency range ranging from 1.8 to 1.9 GHz, marked by the solid lines. Moreover, as depicted the first antenna device is configured to operate in sub-bands, namely a first sub band 604A and a second sub band 604B, within the first frequency band, wherein (or due to) the return loss being very low or negligible. Further shown, a first curve 612A and a second curve 612B indicate return losses associated with each polarization in the first antenna device 402. Moreover, as depicted, a third curve 614 indicates the resulting coupling level between the two polarizations in the first antenna device.

Figure 6B:
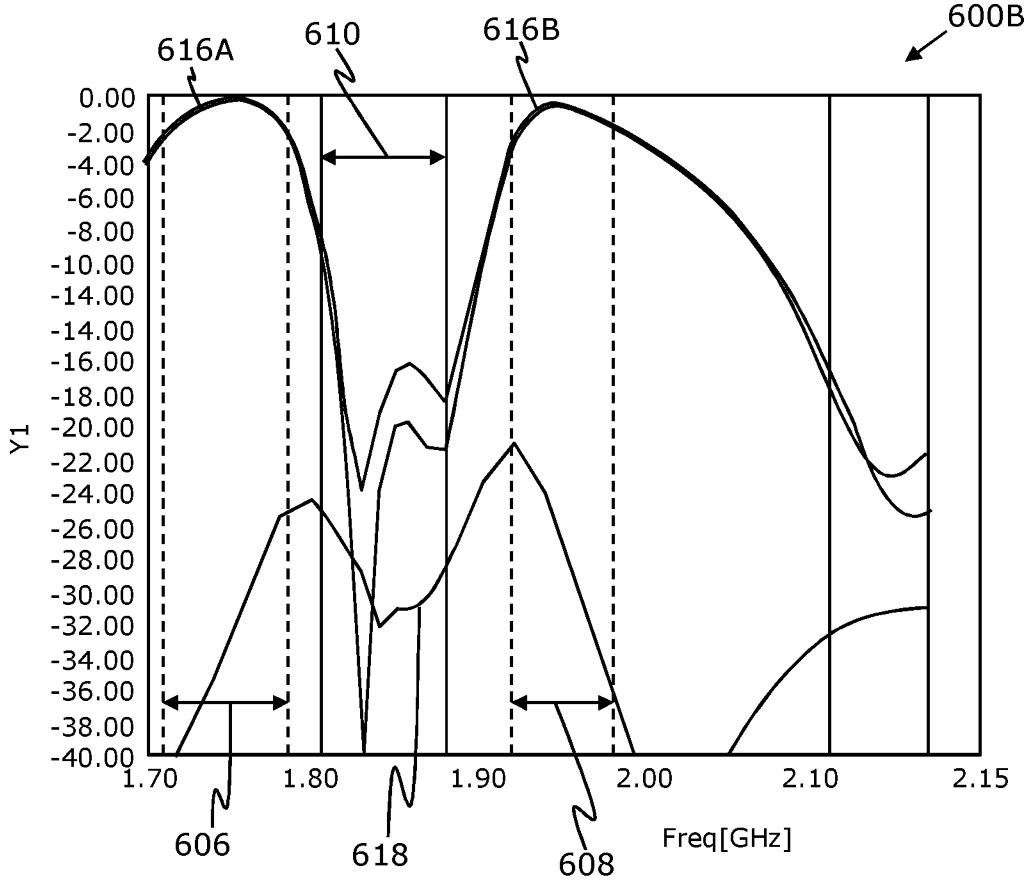
FIG. 6B is a graphical representation that depicts the effects of coupling between two antenna devices of FIG. 6A in two different frequency bands, according to at least one embodiment.

FIG. 6B is a graphical representation 600B that depicts the return losses and coupling levels associated with the second antenna device 404 in the second frequency band 506, according to at least one embodiment. FIG. 6B is described in conjunction with elements from FIGS. 1, 2, 3, 4, 5 and 6A. With reference to FIG. 6B, there is shown the graphical representation 600B depicting the return losses and coupling levels in the second frequency band 506 associated with the second antenna device (similar to the another antenna device 300). Herein, the second antenna device comprises two resonance structures (such as the first resonance structure 304 and the second resonance structure 308 of FIG. 3) that are configured to reject a first sub-band 606 (enclosed by the dotted lines) ranging from 1.7 to 1.8 GHz and a second sub-band 608 (enclosed by the dotted lines) ranging from 1.9 to 2.0 GHz. Notably, the two resonant structures are used individually to provide two separate sub bands for the first antenna device to operate (enclosed by the dotted lines). As a result, the second antenna device (such as the second antenna device 404) is detuned for return loss (RL) worse than −2 dB in the frequency range ranging from 1.7 to 1.8 GHz and the frequency range ranging from 1.9 to 2.0 GHz, marked by the dotted lines. Moreover, as depicted the second antenna device is configured to operate in the sub-band, namely a third sub band 610, within the second frequency band 506, wherein the return loss is very low or negligible. Further shown, a first curve 616A and a second curve 616B indicate return losses associated each polarization in the second antenna device 404. Moreover, as depicted, a third curve 618 indicates the resulting coupling level between the two polarizations in the second antenna device.

Figure 7A:
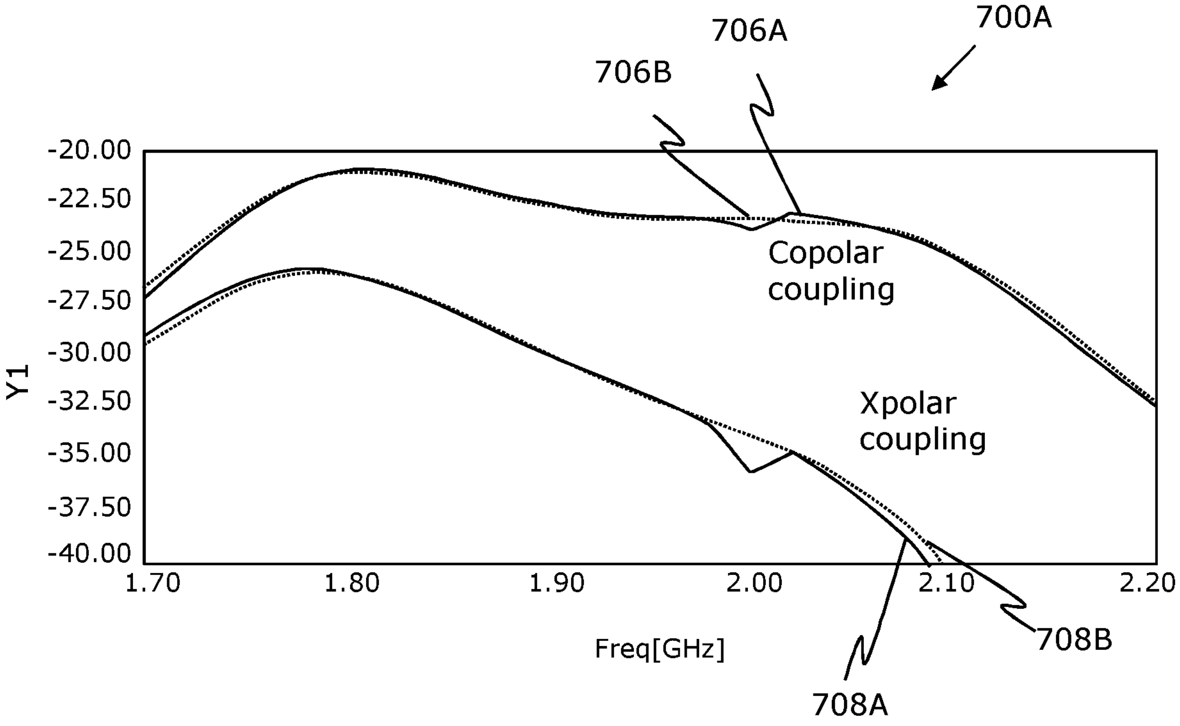
FIG. 7A is a graphical representation that depicts return loss and polarization of an electromagnetic signal radiated by a first antenna device in a first frequency band, according to at least one embodiment.

With reference to FIG. 7A, there is shown a graphical representation 700A depicting mutual coupling between two conventional antenna devices operating without resonant structures in terms of co-polarization (Copol) coupling and cross-polarization (Xpol) coupling. FIG. 7A is described in conjunction with elements from FIGS. 1, 2, 3, 4, 5, 6A and 6B. Typically, the co-polarization refers to the desired polarization of the antenna devices whereas cross-polarization (Xpol) refers to the orthogonal pair of the desired polarization of the antenna devices. The graphical representation 700A represents values of coupling (or coupling levels) on the Y-axis with respect to frequency in Gigahertz (GHz) on the X-axis. The values of coupling levels associated with the co-polarization and cross-polarization curves are represented in terms of decibels (dB). A first co-polarization curve 706A of the first antenna device is represented by a solid line, whereas a second co-polarization curve 706B of the second antenna device 404 is represented by a dotted line. Similarly, a first cross-polarization curve 708A of the first antenna device is represented by a solid line, whereas a second cross-polarization curve 708B of the second antenna device is represented by a dotted line. Notably, the cross-polarization coupling levels are lesser than the co-polarization coupling levels.

Figure 7B:
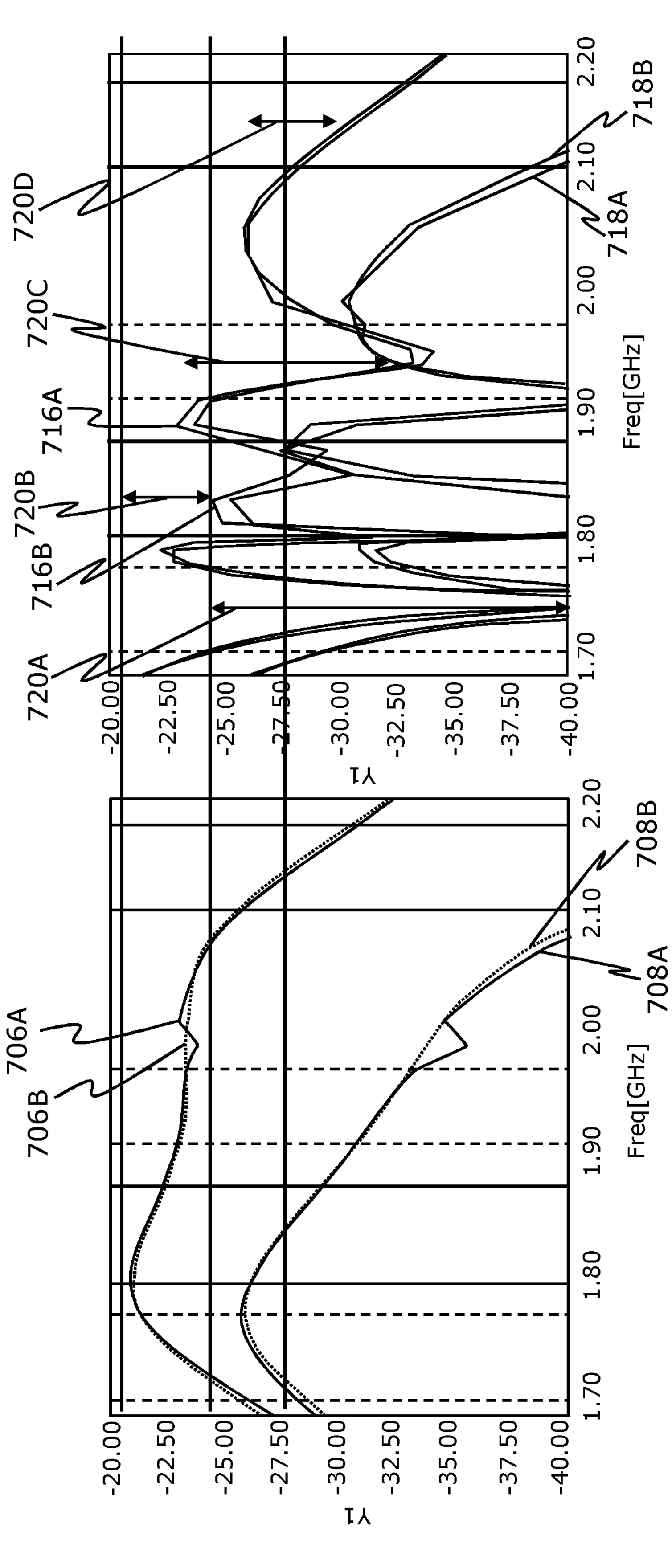
FIG. 7B is a graphical representation that depicts return loss and polarization of an electromagnetic signal radiated by a second antenna device in a second frequency band, according to at least one embodiment.

FIG. 7B is a graphical representation 700B that depicts the effect on the antenna coupling between the two antenna devices (such as the first antenna device 100, the second antenna device 300) operating in two different frequency bands, such as the first frequency band 504, the second frequency band 506 respectively, according to at least one embodiment. FIG. 7B is described in conjunction with elements from FIGS. 1, 2, 3, 4, 5, 6A, 6B and 7A. With reference to FIG. 7B, there is shown a graphical representation 700B depicting the mutual coupling between the two antenna devices operating with the resonance structures (such as the first resonant structure 104, and the second resonant structure 304) in terms of the co-polarization (Copol) coupling and the cross-polarization (Xpol) coupling. The graphical representation 700B represents coupling levels on the Y-axis with respect to frequency in Gigahertz (GHz) on the X-axis. The values of coupling levels associated with the co-polarization and cross-polarization curves are represented in terms of decibels (dB). A first curve 716A indicates the coupling level associated with the first antenna device operating in the first frequency band 504 due to the co-polarization (Copol) coupling. Similarly, a second curve 716B indicates the coupling levels associated with the second antenna device operating in the second frequency band 506 due to the co-polarization coupling. Further shown, a first curve 718A indicates the coupling levels associated with the first antenna operating in the first frequency band 504 due to the cross-polarization (Xpol) coupling. A second curve 718B indicates the coupling levels associated with the second antenna device operating in the second frequency band 506 due to the cross-polarization coupling.

FIG. 7B shows that there is a drop in the values of the coupling levels associated with both of the first antenna device and the second antenna device due to the presence of the resonant structures. Further depicted, the first antenna device is detuned in two sub-bands, namely a second sub-band (such as from 1.8 GHz-1.9 GHz) and a fourth sub-band (such as from 2.1 GHz-2.2 GHz) enclosed by the solid lines, whereas the second antenna device is detuned in two sub-bands, namely a first sub-band (such as from 1.7 GHz-1.8 GHz) and a third sub-band (such as from 1.9 GHz-2.0 GHz) enclosed by the dotted lines.

As shown in conjunction and comparison with FIG. 7A, the first curve 706A and the second curve 706B associated with the conventional antenna devices of FIG. 7A operating without the resonant structures have higher values of co-polarization coupling in comparison to the first curve 716A and the second curve 716B associated with the two antenna devices operating with the resonant structures. Notably, a drop in the values of the co-polar coupling levels as indicated by 720A, 720B, 720C, 720D is seen as a result of the specific detuning of the two antenna devices. Specifically, the first antenna device detuned in the second sub-band, the fourth sub-band enclosed by the solid lines exhibits a drop in the co-polarization coupling levels indicated by 720A, 720C and the second antenna device detuned in the first sub-band, the third sub-band enclosed by the dotted lines exhibits a drop in the co-polarization coupling levels indicated by 720B, 720D.

The drop in the values of the co-polarization coupling is representative of a significant improvement in the performance of the two antenna devices attributed to the reduced coupling levels. Beneficially, a low value of coupling is achieved during operation of the first antenna device and the second antenna device together. In other words, low amount of energy is transferred from one antenna device to the other. As a result, the two antenna devices are able to function or operate being very closely spaced, minimizing the impact of antenna deployment.

In at least one embodiment, the antenna device 100 and the antenna device 300 each includes two or more resonant structures (such as the resonant structure 104, the resonant structure 304) operating in either of the first frequency band or the second frequency band. Specifically, the antenna device 100 or the another antenna device 300 includes either three or four resonant structures arranged either in pairs of two resonant structures at each site (i.e. the radiator 102 or the director 106) or alone at either site. The two or more resonant structures are configured to operate either separately to detune or filter separate sub-bands in either of the frequency bands or operate in conjunction to detune or filter a common sub-band in a more efficient manner. In an exemplary scenario, the antenna device 100 comprises a total of three resonant structures, wherein two of the three resonant structures are arranged on the top and bottom of the either the radiator 102 or the director 106, In other words, the two resonant structures is arranged at the radiator 102 and the third resonant structure arranged at the director 106 or vice versa. In another exemplary scenario, the another antenna device 300 comprises a total of four resonant structures arranged in pairs at each site i.e. two resonant structures are arranged on the top and bottom of the radiator 302 and another two resonant structures are arranged on the top and bottom of the director 306. Beneficially, the two or more resonant structures (such as of the antenna device 100) are implemented separately to filter two or more smaller sub-bands in either of the first or second frequency band (such as for the another antenna device 300 to operate) or the two or more resonant structures (such as of the first antenna device) are implemented together to filter a larger sub-band in either of the first or second frequency band (such as for the another antenna device 300 to operate).

FIGS. 8-11 are alternative embodiments of the resonant structure of antenna devices, in accordance with various embodiments described herein. FIGS. 8-11 is described in conjunction with elements from FIGS. 1, 2, 3, 4, 5, 6A, 6B, 7A and 7B. With reference to FIGS. 8-11, there is shown alternative embodiments of the resonant structure (such as the resonant structures 104, 108, 304 and 308) of an antenna device (such as the antenna device 100 or the another antenna device 300). Notably, the alternative illustrations are the alternative implementations or configurations of the resonant structure that are applied to the antenna device such as the antenna device 100 or the antenna device 300 is implemented, without limiting the scope of the embodiments described herein. Typically, the size and shape of the resonant structure is varied to set the resonant frequency. A person skilled in the art appreciates that the variations in the shape and size of the resonant structure does not limit its function and application, but only the associated resonant frequency. Specifically, the variations in the resonant frequency are brought about by a variation in the size and shape of a stub associated with the resonant structure. The term "stub" refers to a length of transmission line or waveguide that is connected at one end of an antenna device. Conventionally, stubs are used in antenna impedance matching circuits, frequency selective filters, and resonant circuits for UHF electronic oscillators and RF amplifiers. Notably, the implementation of the stub is used to match a transmission line to an antenna or load, wherein the matching depends on the spacing between the two wires of the stub and the point at which the transmission line is connected to the stub.

Figure 8:
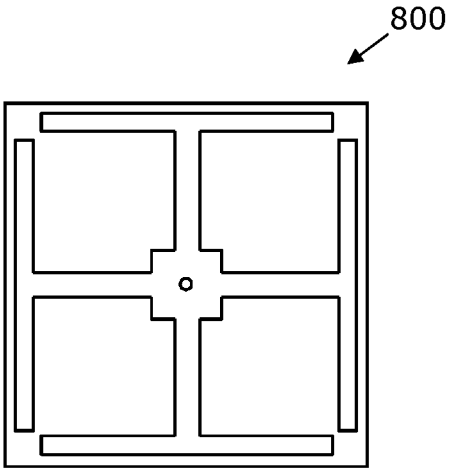
FIGS. 8-11 are exemplary alternative embodiments of resonant structures of an antenna device, according to at least one embodiment.

Referring to FIG. 8, there is shown a resonant structure 800 having dual joined stubs, wherein the length of the stubs is varied to set the resonant frequency of the resonant structure 800.

Figure 9:
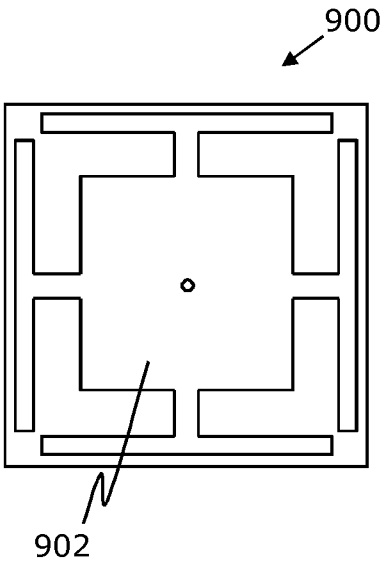

Referring to FIG. 9, there is shown a resonant structure 900 having dual joined stubs along with an additional resonant square 902 at the centre of the resonant structure. Herein, the length of the stubs and the size of the resonant square 902 is varied to set the resonant frequency of the resonant structure 900.

Figure 10:
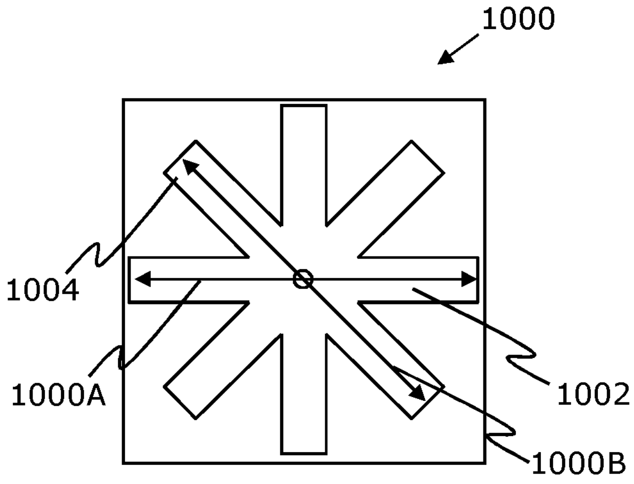

Referring to FIG. 10, there is shown a resonant structure 1000 having a star shape. As shown, the star shaped resonant structure has seven pointed edges constituting four stubs, wherein the length of each stub is different. In an implementation, a first stub 1002 has a different length as depicted by the line 1000A with respect to a second stub 1004 as depicted by the line 1000B, wherein the different stub lengths of the first stub 1002 and the second stub 1004 provide dual resonance (or dual resonant frequency) to the resonant structure 1000. Typically, each stub (such as the first stub 1002, the second stub 1004) having a different length with respect to one another and is responsible for providing different resonant frequencies to the resonant structure 1000.

Figure 11:
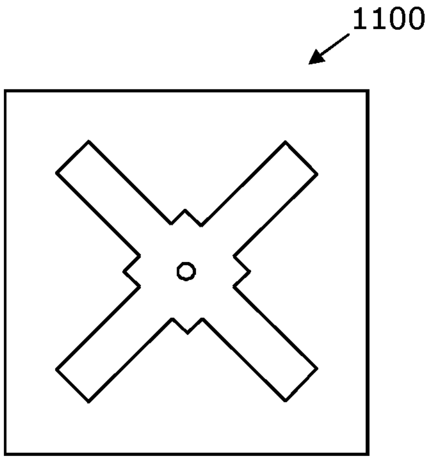

Referring to FIG. 11, there is shown a resonant structure 1100 having a cross-shape. As shown, the cross-shaped resonant structure 1100 (similar to the resonant structure 104 or 108 of FIG. 1) has two stubs arranged as a cross or cross shaped structure, wherein the length of the cross (or cross shaped structure) sets the resonant frequency of the resonant structure 1100.

Modifications to embodiments described in the foregoing are able to be made without departing from the scope embodiments described herein as defined by the accompanying claims. Expressions such as "including", "comprising", "incorporating", "have", "is" used to describe and claim at least one embodiment are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". Certain features of embodiments, which are, for clarity, described in the context of separate embodiments, are also able to be provided in combination in a single embodiment. Conversely, various features of the invention, which are, for brevity, described in the context of a single embodiment, is also provided separately or in any suitable combination or as suitable in any other embodiment described herein.

The invention claimed is:

1. An antenna device comprising:

a radiator configured to radiate an electromagnetic signal in a direction parallel to a radiating axis of the antenna device, the radiator having a substantially planar shape perpendicular to the radiating axis;

a resonant structure adjacent to the radiator, the resonant structure having a substantially planar shape parallel to the radiator;

a director having a planar structure arranged parallel to the radiator and spaced apart from the radiator and the resonant structure, the director being configured to increase the energy gain and directionality of the radiation of the radiator; and a first set of supporting structures configured to hold the director at a height H from the radiator;

wherein the radiator is configured to radiate the electromagnetic signal in a first frequency band and the resonant structure is spaced apart from the radiator by a distance D based on a central wavelength of the first frequency band and is configured to have a resonant frequency within the first frequency band, and wherein the resonant structure is configured to detune the radiator at the resonant frequency of the resonant structure.

2. The antenna device of claim 1, wherein the resonant structure is arranged in the reactive near field of the radiator.

3. The antenna device of claim 1, wherein a distance between the radiator and the resonant structure is determined to be between 0.001 and $0.1\lambda_{central}$.

4. The antenna device of claim 1, wherein the resonant structure is formed from one of a metal sheet, a printed circuit board or a board with metal foil deposit; and is mounted to the radiator by one or more supports or is mounted on a substrate laminated onto the radiator.

5. The antenna device of claim 1, wherein the radiator is a patch antenna.

6. The antenna device of claim 5, further comprising:

at least one second resonant structure adjacent to the director, the resonant structure having a substantially planar shape parallel to the director;

wherein the second resonant structure is configured to have a second resonant frequency within the first frequency band.

7. The antenna device of claim 1, wherein the resonant structure is configured to act as a parasitic element of the antenna device.

8. The antenna device of claim 1, wherein a shape of the resonant structure is symmetric about a central point of the resonant structure.

9. The antenna device of claim 1, wherein a length of the resonant structure is determined based on the resonant frequency.

10. The antenna device of claim 1, wherein the resonant frequency is determined based on a second frequency band radiated by another antenna device arranged adjacent to the antenna device.

11. An array of antenna devices, comprising:

two or more of the antenna devices, wherein the two or more of the antenna devices include:

a radiator configured to radiate an electromagnetic signal in a direction parallel to a radiating axis of the antenna device, the radiator having a substantially planar shape perpendicular to the radiating axis;

a resonant structure adjacent to the radiator, the resonant structure having a substantially planar shape parallel to the radiator;

a director having a planar structure arranged parallel to the radiator and spaced apart from the radiator and the resonant structure, the director being configured to increase the energy gain and directionality of the radiation of the radiator; and a first set of supporting structures configured to hold the director at a height H from the radiator;

wherein the radiator is configured to radiate the electromagnetic signal in a first frequency band and the resonant structure is spaced apart from the radiator by a distance D based on a central wavelength of the first frequency band and is configured to have a resonant frequency within the first frequency band, and wherein the resonant structure is configured to detune the radiator at the resonant frequency of the resonant structure.

12. The array of claim 11, wherein:

a first antenna device of the two or more antenna devices operating in the first frequency band and having a first resonant structure tuned to a first resonant frequency; and a second antenna device of the two or more antenna devices operating in a second frequency band and having a second resonant structure tuned to a second resonant frequency;

wherein the first resonant frequency is determined based on the second frequency band and the second resonant frequency is based on the first frequency band.

13. The array of claim 12, wherein the first antenna device is configured for uplink and the second antenna device is configured for downlink.

14. The array of claim 12, wherein the first frequency band overlaps with the second frequency band.

15. The array of claim 12, wherein the first frequency band and the second frequency band each includes a plurality of sub-bands and the sub-bands of the first frequency band are interleaved with the sub-bands of the second frequency band.

16. A base station, comprising:

an antenna device, wherein the antenna device includes:

a radiator configured to radiate an electromagnetic signal in a direction parallel to a radiating axis of the antenna device, the radiator having a substantially planar shape perpendicular to the radiating axis;

a resonant structure adjacent to the radiator, the resonant structure having a substantially planar shape parallel to the radiator;

a director having a planar structure arranged parallel to the radiator and spaced apart from the radiator and the resonant structure, the director being configured to increase the energy gain and directionality of the radiation of the radiator; and a first set of supporting structures configured to hold the director at a height H from the radiator;

wherein the radiator is configured to radiate the electromagnetic signal in a first frequency band and the resonant structure is spaced apart from the radiator by a distance D based on a central wavelength of the first frequency band and is configured to have a resonant frequency within the first frequency band, and wherein the resonant structure is configured to detune the radiator at the resonant frequency of the resonant structure.

17. The base station of claim 16, wherein the resonant structure is arranged in the reactive near field of the radiator.

18. The base station of claim 16, wherein the radiator is a patch antenna.

19. The base station of claim 18, wherein the antenna device further includes at least one second resonant structure adjacent to the director, the resonant structure having a substantially planar shape parallel to the director;

wherein the second resonant structure is configured to have a second resonant frequency within the first frequency band.

20. The base station of claim 16, wherein the resonant structure is configured to act as a parasitic element of the antenna device.

* * * * *